M. ZINSLI.
CLUTCH FOR HARVESTER REELS.
APPLICATION FILED MAR. 27, 1912.
1,054,480.
Patented Feb. 25, 1913.
2 SHEETS—SHEET 1.
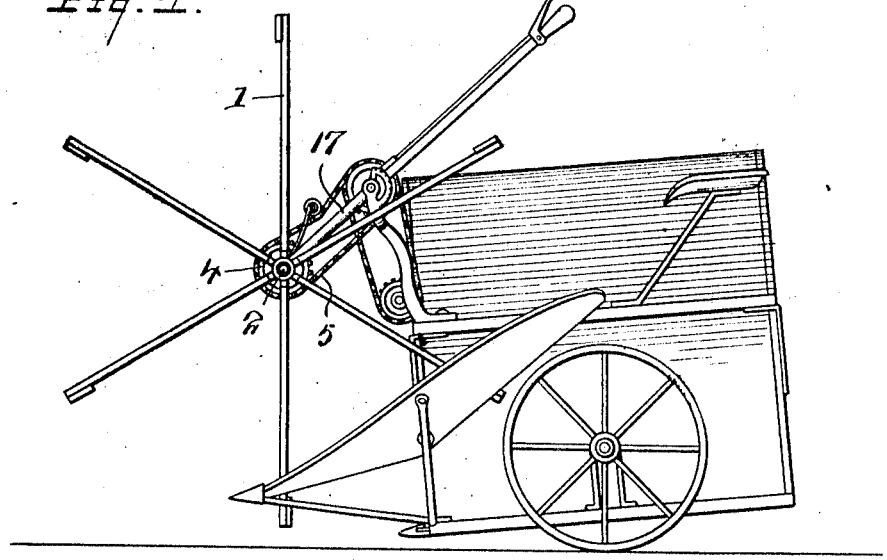
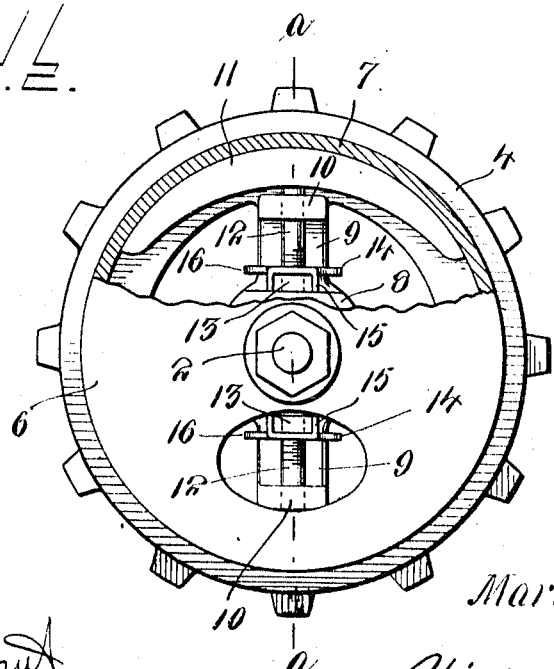
Inventor
Martin Zinsli
By Victor J. Evans
Attorney
Witnesses
E. Q. Ruppert
J. W. Garner

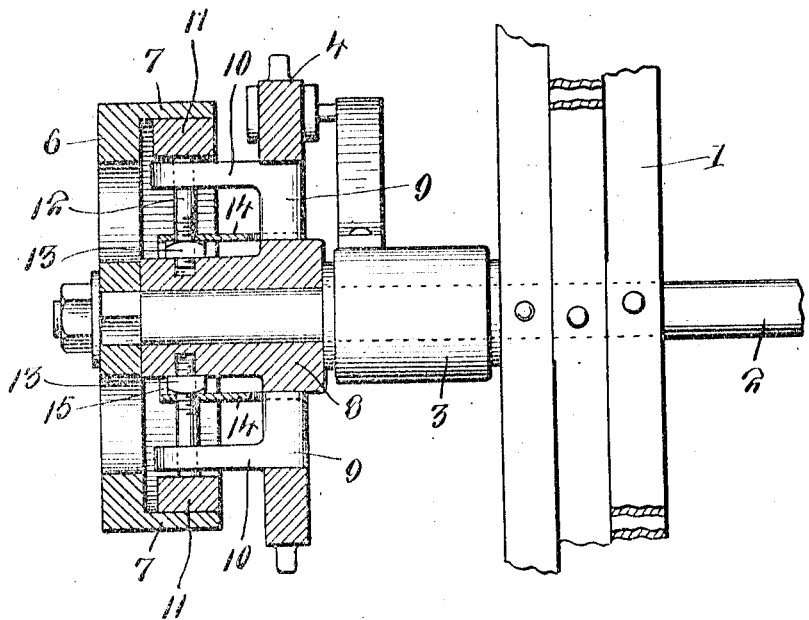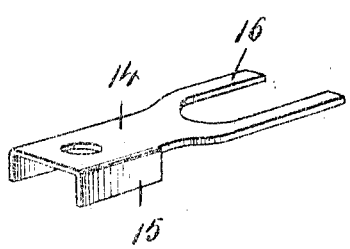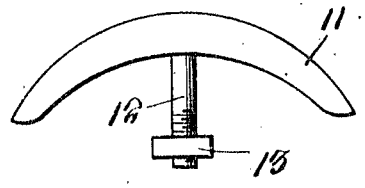

UNITED STATES PATENT OFFICE.

MARTIN ZINSLI, OF SENTINEL BUTTE, NORTH DAKOTA.

CLUTCH FOR HARVESTER-REELS.

1,054,480.

Specification of Letters Patent. Patented Feb. 25, 1913.

Application filed March 27, 1912. Serial No. 686,479.

*To all whom it may concern:*

Be it known that I, MARTIN ZINSLI, a citizen of the United States, residing at Sentinel Butte, in the county of Billings and State of North Dakota, have invented new and useful Improvements in Clutches for Harvester-Reels, of which the following is a specification.

This invention relates to improvements in reels for self-binding harvesters and especially with reference to means for driving a harvester reel and embodying a clutch mechanism which prevents the reel from being broken or injured in the event that it should be lowered to such an extent as to come in contact with the ground or with an object encountered during the operation of the harvester, the object of my invention being to provide an improved clutch mechanism for operating a harvester reel and which enables the reel to be lowered, without danger of breaking, sufficiently to cause the reel to operate successively on short crops of flax or grain, the invention consisting in the construction, combination and arrangement of devices, hereinafter described and claimed.

In the accompanying drawings:—Figure 1 is a side elevation of a portion of a self-binding harvester provided with a reel and my improved mechanism for driving the reel and preventing the reel from breaking in the event that it should encounter an obstruction. Fig. 2 is a detail elevation, partly in section, of the clutch members of my reel driving or operating mechanism on a larger scale. Fig. 3 is a vertical transverse sectional view of the same on the plane indicated by the line *a—a* of Fig. 2. Fig. 4 is a detail perspective view of one of the locking plates. Fig. 5 is a detail elevation of one of the friction shoes.

For the purposes of this specification, I show a reel 1 in Fig. 1, which reel is of the usual and may be of any suitable construction and is mounted on a revoluble shaft 2 which has its bearing as at 3 in a lever 17 which permits the reel to be raised and lowered so that it may be adjusted with respect to the cutting mechanism of the harvester as may be required for operating in flax, grain or other like crops of any height.

In accordance with my invention, I provide the reel shaft with a driving sprocket wheel 4 which is driven by the other endless sprocket chain 5 and is mounted loosely on the reel shaft so that the said sprocket wheel may turn independently of the reel shaft. In connection with the driving sprocket wheel, I provide a clutch member 6 which is fixed to the reel shaft for rotation therewith and is provided with an annular flange 7 on the side next the sprocket wheel and which extends toward the sprocket wheel. One side of the hub 8 of the sprocket wheel projects laterally therefrom and bears against the inner side of the clutch member 6 and the sprocket wheel is also provided with spoke members 9 each of which has a horizontally arranged arm 10 which projects toward the clutch member 6 and is arranged concentrically with respect to and is spaced from the annular flange 7 of said clutch member. Friction shoes 11 which are segmental in form are arranged on the inner side of the flange 7 of the clutch member 6 and bear against said flange. Each friction shoe has a radially arranged screw threaded arm 12 which is free to move radially in unthreaded openings with which the hub member 8 and the arms 10 of the sprocket wheel 4 are provided. On each threaded arm 12 is an adjusting nut 13 which engages therewith and bears on the periphery of the hub member 8 of the sprocket wheel 4 and by appropriately adjusting these nuts the friction shoes 11 may be caused to bear frictionally against the flange 7 of the clutch member 6 with any desired degree of force. The radially adjustable friction shoes 11 serve to lock the clutch member 6 to the driving sprocket and wheel 4 so as to cause the said clutch member and, hence, also the shaft and reel to revolve with and be driven by the said wheel 4 under ordinary conditions as when the reel is operating in flax or other grain. In the event, however, that the reel should be adjusted so low, as when operating in short flax, as to be in danger of occasionally striking the ground, no harm would result and the reel would not become broken or otherwise injured, because should the reel thus strike and its rotation be momentarily arrested, the driving sprocket wheel 4 can continue to revolve as before, the friction shoes carried by the said sprocket wheel and the annular friction flange of the clutch member 6 causing the sprocket wheel to slip or in other words, move to some extent independently of the clutch member 6 and thereby preventing the reel from being subjected to breaking or injuring stress. Hence, by the provision of my improved reel driving mechanism, the reel is adapted to be adjusted safely to a lower extent than heretofore and this is a matter of considerable moment especially when the machine is being operated in short flax as by thus lowering the reel several inches more of the flax straw can be saved and harvested than would be possible if the reel could not be thus adjusted without danger of its becoming broken.

To prevent the adjusting nuts 13 from working loose on the threaded arms of the friction shoes, I provide locking plates 14 each of which has flanges 15 to engage opposite sides of one of the nuts and also as a forked arm 16 to engage astride one of the spoke members of the driving sprocket wheel.

While I have herein shown and described a preferred embodiment of my invention, I would have it understood that changes may be made in the form, construction and proportion of the several parts without departing from the spirit of my invention and within the scope of the appended claims.

I claim:—

1. A revoluble element having a shaft and a clutch member fixed to and revoluble with the shaft and having an annular friction disk extending to one side thereof, in combination with a revoluble driving element mounted on the shaft for rotation thereon independently thereof, and further provided with a hub and with laterally extending arms, friction shoes arranged on the inner side of the friction flange of the clutch member having radially threaded arms guided by the hub member and laterally extending arms of the driving element and adjusting nuts on the said threaded arms of the friction shoes and bearing against the hub of said revoluble driving element, and locking means for the said nuts to prevent casual turning thereof.

2. A revoluble element having a shaft and a clutch member fixed to and revoluble with the shaft and having an annular friction disk extending to one side thereof, in combination with a revoluble driving element mounted on the shaft for rotation thereon independently thereof and further provided with a hub and with laterally extending arms, friction shoes arranged on the inner side of the friction flange of the clutch member having radially threaded arms guided by the hub member and laterally extending arms of the driving element and adjusting nuts on the said threaded arms of the friction shoes and bearing against the hub of said revoluble driving element, and locking means for the said nuts to prevent casual turning thereof, said locking means comprising plates having flanges to engage opposite sides of the nuts and also provided with fork arms to engage the hub members of said driving elements.

In testimony whereof I affix my signature in presence of two witnesses.

MARTIN ZINSLI.

Witnesses:
M. V. HORNING,
O. E. RUSTAD.